United States Patent
Barkan et al.

(10) Patent No.: US 6,805,295 B2
(45) Date of Patent: Oct. 19, 2004

(54) HIGH SPEED LASER SCAN MODULE WITH FOLDED BEAM PATH

(75) Inventors: Edward Barkan, Miller Place, NY (US); Howard M. Shepard, Great River, NY (US); Paul Dvorkis, E. Setauket, NY (US); Igor R. Vinogradov, Bay Shore, NY (US); Mark Krichever, Hauppauge, NY (US); David Tsi Shi, Stony Brook, NY (US); Vladimir Gurevich, Stony Brook, NY (US)

(73) Assignee: Symbol Technologies, Ltd., Holtsville, NY (US)

( * ) Notice: Subject to any disclaimer, the term of this patent is extended or adjusted under 35 U.S.C. 154(b) by 163 days.

(21) Appl. No.: 10/125,149

(22) Filed: Apr. 18, 2002

(65) Prior Publication Data

US 2003/0085283 A1 May 8, 2003

Related U.S. Application Data

(60) Provisional application No. 60/333,219, filed on Nov. 6, 2001.

(51) Int. Cl.[7] ............................................. G06K 7/10
(52) U.S. Cl. ................................................. 235/462.32
(58) Field of Search ..................... 235/462.32, 462.36, 235/462.37, 462.38, 462.39, 462.4, 472.01

(56) References Cited

U.S. PATENT DOCUMENTS

| | | | | |
|---|---|---|---|---|
| 3,916,158 A | * | 10/1975 | Sansone et al. | ......... 235/462.39 |
| 4,962,980 A | * | 10/1990 | Knowles | ...................... 359/213 |
| 4,965,829 A | * | 10/1990 | Lemelson | .................... 382/101 |
| 5,486,944 A | | 1/1996 | Bard et al. | |
| 5,635,700 A | * | 6/1997 | Fazekas | ................. 235/462.06 |
| 5,786,581 A | | 7/1998 | Eastman et al. | |
| 5,955,720 A | | 9/1999 | He et al. | |
| 6,000,619 A | | 12/1999 | Reddersen et al. | |
| 6,094,288 A | * | 7/2000 | Tamburrini | ................. 359/214 |
| 6,216,951 B1 | | 4/2001 | Swift et al. | |
| 6,360,949 B1 | | 3/2002 | Shepard et al. | |

FOREIGN PATENT DOCUMENTS

| | | |
|---|---|---|
| EP | 1 017 006 A2 | 12/1999 |
| EP | 1 039 409 A2 | 9/2000 |
| JP | 11-259592 | 9/1999 |

* cited by examiner

Primary Examiner—Karl D. Frech
Assistant Examiner—Lisa M. Caputo
(74) Attorney, Agent, or Firm—Kirschstein, et al.

(57) ABSTRACT

A scan module in an electro-optical reader includes a first beam-folding mirror on a raised support wall at a rear of a support, and a second beam-folding mirror at a front of the support and operative for reflecting light through an opening in a frame wall to the first mirror for reflection therefrom above the frame wall between the front and rear of the support.

10 Claims, 6 Drawing Sheets

HIGH SPEED LASER SCAN MODULE WITH FOLDED BEAM PATH

RELATED APPLICATIONS

This application claims the priority of U.S. Provisional Application Ser. No. 60/333,219, filed Nov. 6, 2001 and is related to application U.S. Pat. application Ser. No. 09/223,482, filed Dec. 30, 1998, now U.S. Pat. No. 6,491,222, which was a continuation-in-part of U.S. patent application Ser. No. 09/048,418, filed Mar. 26, 1998, now U.S. Pat. No. 6,114,712, both patents being hereby incorporated by reference.

BACKGROUND OF THE INVENTION

1. Field of the Invention

The field of the invention relates to electro-optical readers or scanning systems, such as bar code symbol readers, and more particularly to the optical path design in a scanning module for use in applications requiring a relatively long single line scan line near the reader in a compact bar code reader.

2. Description of the Related Art

Electro-optical readers, such as bar code symbol readers, are now very common. Typically, a bar code symbol comprises one or more rows of light and dark regions, typically in the form of rectangle. The widths of the dark regions, i.e., the bars and/or the widths of the light regions, i.e., the spaces, between the bars encode information in the symbol.

A bar code symbol reader illuminates the symbol and senses light reflected from the regions of differing light reflectivity to detect the relative widths and spacings of the regions and derive the encoded information. Bar code reading type data input systems improve the efficiency and accuracy of data input for a wide variety of applications. The ease of data input in such systems facilitates more frequent and detailed data input, for example to provide efficient inventories, tracking of work in progress, etc. To achieve these advantages, however, users or employees must be willing to consistently use the readers. The readers therefore must be easy and convenient to operate.

A variety of scanning systems are known. One particularly advantageous type of reader is an optical scanner which scans a beam of light, such as a laser beam, across the symbols. Laser scanner systems and components of the type exemplified by U.S. Pat. Nos. 4,387,297 and 4,760,248, which are owned by the assignee of the instant invention and are incorporated by reference herein, have generally been designed to read indicia having parts of different light reflectivity, i.e., bar code symbols, particularly of the Universal Product Code (UPC) type, at a certain working range or reading distance from a hand-held or stationary scanner.

In the laser beam scanning systems known in the art, a single laser light beam is directed by a lens or other optical components along the light path toward a target that includes a bar code symbol on the surface. The moving-beam scanner operates by repetitively scanning the light beam in a line or series of lines across the symbol by means of motion or a scanning component, such as the light source itself or a mirror disposed in the path of the light beam. The scanning component may either sweep the beam spot across the symbol and trace a scan line across the pattern of the symbol, or scan the field of view of the scanner, or do both. The laser beam may be moved by optical or opto-mechanical means to produce a scanning light beam. Such action may be performed be either deflecting the beam (such as by a moving optical element, such as a mirror) or moving the light source itself. U.S. Pat. No. 5,486,944 describes a scanning module in which a mirror is mounted on a flex element for reciprocal oscillation by electromagnetic actuation. U.S. Pat. No. 5,144,120 to Krichever et al., describes laser, optical and sensor components mounted on a drive for repetitive reciprocating motion either about an axis or in plane to effect scanning of the laser beam.

Another type of bar code scanner employs electronic means for causing the light beam to be deflected and thereby scan a bar code symbol, rather than using a mechanical motion to move or deflect the beam. For example, a linear array of closely spaced light sources activated one at a time in a regular sequence may be transmitted to the bar code symbol to simulate a scanned beam for a single source. Instead of a single linear array of light sources, a multiple-line array may also be employed, producing multiple scan lines. Such type of bar code reader is disclosed in U.S. Pat. No. 5,258,605 to Metlitsky et al.

Bar code reading systems also include a sensor or photodetector which detects light reflected or scattered from the symbol. The photodetector or sensor is positioned in the scanner in an optical path so that it has a field of view which ensures the capture of a portion of the light which is reflected or scattered off the symbol, detected, and converted into an electrical signal. Different photodiode arrangements are described in U.S. Pat. Nos. 5,635,700; 5,682,029; and 6,213,399.

In retroreflective light collection, a single optical component e.g., a reciprocally oscillatory mirror, such as described in Krichever et al. U.S. Pat. No. 4,816,661 or Shepard et al. U.S. Pat. No. 4,409,470, both herein incorporated by reference, and U.S. Pat. No. 6,114,712, filed Oct. 9, 1996, scans the beam across a target surface and directs the collected light to a detector. The mirror surface usually is relatively large to receive as much incoming light as is possible, only a small detector is required since the mirror can focus the light onto a small detector surface, which increases signal-to-noise ratio.

Of course, small scan elements are preferable because of the reduced energy consumption and increased frequency response. When the scan element becomes sufficiently small, however, the area of the scanning mirror can no longer be used as the aperture for the received light. One solution is to use a staring detection system (a non-retroreflective system) which receives a light signal from the entire field which the scanned laser spot covers.

In non-retroreflective light collection, the reflected laser light is not collected by the same optical component used for scanning. Instead, the detector is independent of the scanning beam, and is typically constructed to have a large field of view so that the reflected laser light traces across the surface of the detector. Because the scanning optical component, such as a rotating mirror, need only handle the outgoing light beam, it can be made much smaller. On the other hand, the detector must be relatively large in order to receive the incoming light beam from all locations in the scanned field.

Electronic circuitry and software decode the electrical signal into a digital representation of the data represented by the symbol that has been scanned. For example, the analog electrical signal generated by the photodetector may be converted by a digitizer into a pulse width modulated digitized signal, with the widths corresponding to the physical widths of the bars and spaces. Alternatively, the analog electrical signal may be processed directly by a software decoder. See, for example, U.S. Pat. No. 5,504,318.

The decoding process of bar code reading systems usually works in the following way. The analog signal from the sensor or photodetector may initially be filtered and processed by circuitry and/or software to remove noise, adjust the dynamic range, or compensate for signal non-uniformities. Samples may then be taken of the analog signal, and applied to an analog-to-digital converter to convert the samples to digital data. See, for example, U.S. Pat. No. 6,170,749, which is herby incorporated by reference. Alternatively, analog circuitry may be used to digitize the shape of the signal.

A variety of mirror and motor configurations can be used to move the beam in a desired scanning pattern. A scanner which produces an elongated scan line is described in U.S. Pat. No. 5,621,203. U.S. Pat. No. 4,251,798 discloses a rotating polygon having a planar mirror at each side, each mirror tracing a scan line across the symbol. U.S. Pat. Nos. 4,387,297 and 4,409,470 both employ a planar mirror which is repetitively and reciprocally driven in alternate circumferential directions about a drive shaft on which the mirror is mounted. U.S. Pat. No. 4,816,660 discloses a multi-mirror construction composed of a generally concave mirror portion and a generally planar mirror portion. The multi-mirror construction is repetitively reciprocally driven in alternative circumferential directions about a drive shaft on which the multi-mirror construction is mounted. U.S. Pat. No. 6,247,647 describes an arrangement for providing either a multiple line, or single line, scan pattern by means of a controller. All of the above-mentioned US patents are incorporated herein by reference.

In electro-optical scanners of the type discussed above, the implementation of the laser source, the optics the mirror structure, the drive to oscillate the mirror structure, the photodetector, and the associated signal processing and decoding circuitry as components all add size and weight to the scanner. In applications involving protracted use, a large, heavy scanner can produce user fatigue. When use of the scanner produces fatigue or is in some other way inconvenient, the user is reluctant to operate the scanner. Any reluctance to consistently use the scanner defeats the data gathering purposes for which such bar code systems are intended. Also, a need exists for an interchangeable compact slim and module to fit into small compact devices, such as notebooks, portable digital assistants, pagers, cell phones, and other pocket appliances.

Thus, an ongoing objective of bar code reader development is to miniaturize the reader as much as possible, and a need still exists to further reduce the size and weight of the scan module and to provide a relatively thin or flat scan module, so that the single scan line can be elongated close to the reader. The mass of the moving components should be as low as possible to minimize the power required to produce the scanning movement.

It is also desirable to modularize the scan engine so that a particular module can be used in a variety of different appliances. A need exists, to develop a particularly compact, lightweight module which contains all the necessary scanner components for such applications.

SUMMARY OF THE INVENTION

Objects of the Invention

It is an object of the present invention to provide a module for use in a bar code reader capable of emitting an elongated scan line close to the module.

It is another object of the invention to provide a module that emits a scan line over and parallel to the top surface of the module.

It is a further object of the present invention to provide a non-retroreflective scan module with multiple photodectectors.

It is still further object of the present invention to provide collection optic in a scan module with adjusts the optical power as a function of position on the scan line.

A related object is to provide a non-retroreflective electro-optical scanning module which is both thinner, smaller and lighter in weight then using discrete optical components, while providing a collector area of at least 20 mm$^2$.

It is yet a further object to produce a module having a step-shaped form factor which may be manufactured with a print circuit board forming the base of the module.

Additional objects, advantages and novel features of the present invention will become apparent o those skilled in the art from this disclosure, including the following detailed description, as well as by practice of the invention. While the invention is described below with reference to preferred embodiments, it should be understood that the invention is not limited thereto. Those of ordinary skill in the art having access to the teachings herein will recognize additional applications, modifications and embodiments in other fields, which are within the scope of the invention as disclosed and claimed herein and with respect to which invention could be of significant utility.

Features of the Invention

Briefly, and in general terms, the present invention provides a scan module for use in bar code reading systems for reading indicia having portions of different light reflectivity and located on a target at a distance from the scan module, including a generally rectangular module including a support having a generally planar base and planar peripheral sides orthogonal thereto: a laser light source mounted on the support for producing a light beam; a scan mirror mounted on the support in spaced relationship to the light source and positioned so that the light beam from the light source is directed by the scan mirror along a first optical path to a fold mirror mounted on the support which directs the light beam along a second optical path exterior to the scan module in the direction of the target. There are further provided a drive moving the scan mirror so that the light beam is moved in a scanning pattern substantially parallel to the peripheral sides of the support and across the indicia to be read; and at least one sensor mounted on the support for directly receiving reflected light from the target and converting the reflected light in to an electrical signal.

According to another aspect of the invention there is provided an optical scan module having mounted thereon a light source for emitting a light beam; and a scanning assembly for receiving said light beam and for generating therefrom a scanning beam directed to the bar code symbol to be scanned so that the emitted scanning beam is longer than the side of the module which the scanning beam passes over enroute to the target.

According to yet another aspect the invention there is provided a small-size optical scan module in the form factor of a substantially rectangular, step-shaped, parallelepiped module having dimensions approximately 42 mm×24 mm×11 mm. In the first embodiment, on one of the larger sides (i.e. preferably a peripheral side 42 mm×24 mm there is mounted thereon a light source for emitting a light beam, a scanning assembly for receiving said light beam and for generating therefrom a scanning beam directed to an indicia to be read, at least one photodtector and collection optics arranged to received reflected light from the symbol and to direct it to said detector.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

The invention relates to bar code readers of the type generally described in the above identified patents and patent applications for reading bar code symbols. As used in this specification and the claims, the term "bar code symbol" is intended to be broadly construed and to cover not only symbol patterns composed of alternating bars and spaces, but also other graphic patterns, such as dot or matrix array patterns, and, in short, indicia having portions of different light reflectivity or surface characteristics that results in contrasting detected signal characteristics that can be used for encoding information and can be read and decoded with the type of apparatus disclosed herein.

Figure 1:
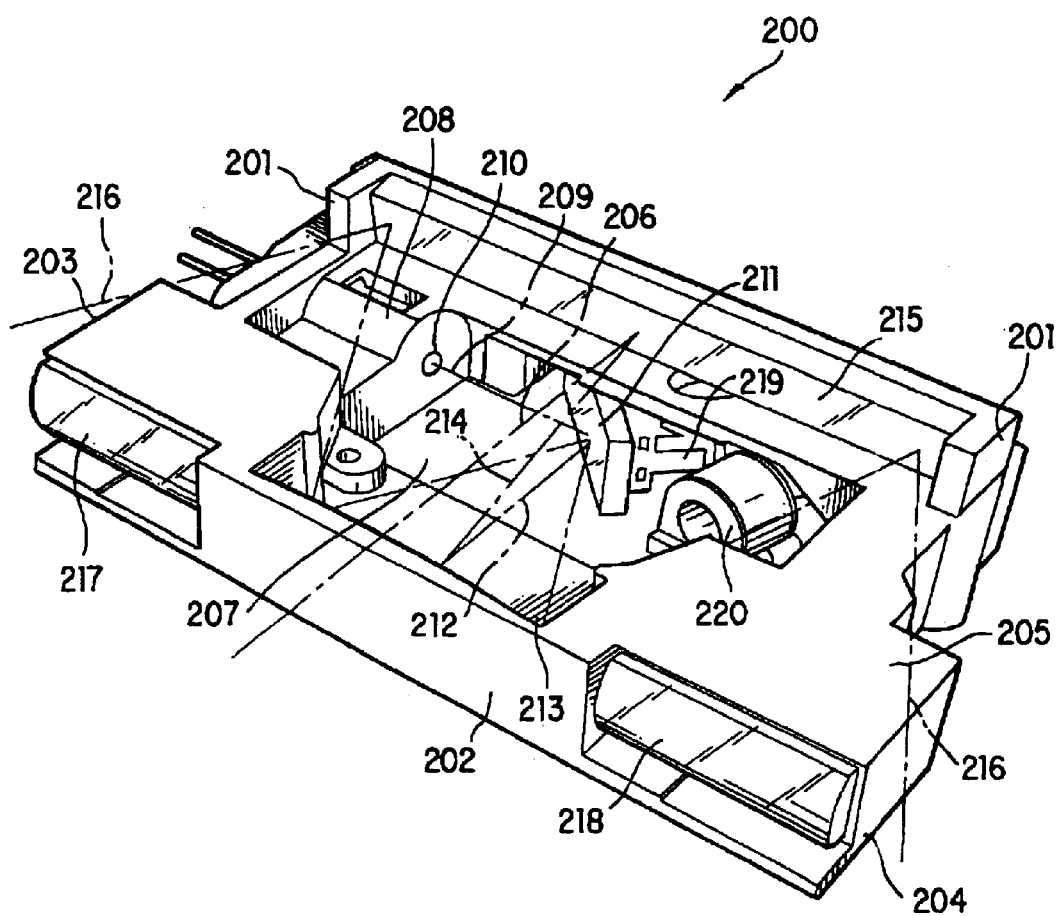
FIG. 1 is a perspective view of an optical assembly according to a first preferred embodiment of the invention.

As a preferred embodiment, we describe the implementation of the present invention in a laser-scanning, bar code reading module similar to the module illustrated in FIG. 1. The modular device of FIG. 1 is generally of the style disclosed in U.S. Pat. No. 5,367,151, issued to Dvorkis et al. assigned to Symbol Technologies, Inc. and hereby incorporated by reference, and also similar to the configuration of a bar code reader commercially available as part number SE 1000 or SE 1200 from Symbol Technologies, Inc. of Holtsville, N.Y. Alternatively, or in addition, features of U.S. Pat. Nos. 4,387,297, and 4,760,248 issued to Swartz et al., or U.S. Pat. No. 4,409,470 issued to Shepard et al., both such patents assigned to Symbol Technologies, Inc., may be employed in constructing the bar code reader module of FIG. 1. These U.S. Pat. Nos. 4,760,248, 4,387,297 and 4,409,470 are incorporated herein by reference.

The module 200 shown in FIG. 1 is formed from an integral frame or assembly 201 which is generally a rectangular parallelepiped in shape, having a front wall side 202, side walls 203 and 204, preferably an open top surface 205 over which a laser beam 206 is scanned along a scanning path 216, and a bottom surface (not shown) enclosed by a printed circuit board 207 on which electrical components may be mounted. A laser diode assembly 208 is mounted on the frame 201 for producing a light beam 209, which is emitted through aperture 210 in the laser diode assembly. The light beam 209 is directed to the scanning mirror 211 from which it is reflected and scanned along path 212 to fold mirror 213 (only the edge of which is seen) which is mounted on the front wall 202 of the assembly. The beam is then reflected from fold mirror 213 along path 214 to the fold mirror 215. The beam is then reflected from mirror 215 and directed along path 206 over the surface 205 and exteriorly of the module 200 in the direction of the target 212.

Light is scattered or reflected from the symbol to the optical collection lenses 217 and 218 behind, which is are photodetectors.

The Figure also depicts a drive coil 220 and moving mirror assembly 219 which supports the mirror 211 and moves in response to current changes in the drive coil 220.

The laser diode 208 may be operated in a continuous "constant power" mode, pulsed, or modulated with different power levels, depending on the specific application. It is also known to provide circuitry to maintain the laser diode at a predetermined output power level using a closed-loop feedback circuit using a monitor photodiode associated with the diode.

The optical subassembly associated with the laser diode 208 may include a focusing lens and/or aperture stop of the following lens types, depending on the application: spherically symmetric glass or plastic lenses; aspheric glass or plastic lenses, rotationally symmetric as well as non-rotationally symmetric around the optical axis, such as cylindrical optical elements as well including gradient index lens, Fresnel lens, binary optical lens, or multi-level binary optical lens; lens systems where the lens diameter itself acts as a functional aperture stop for the system; or holographic optical elements, including but not restricted to Fresnel "zone plate" optics.

Figure 2:
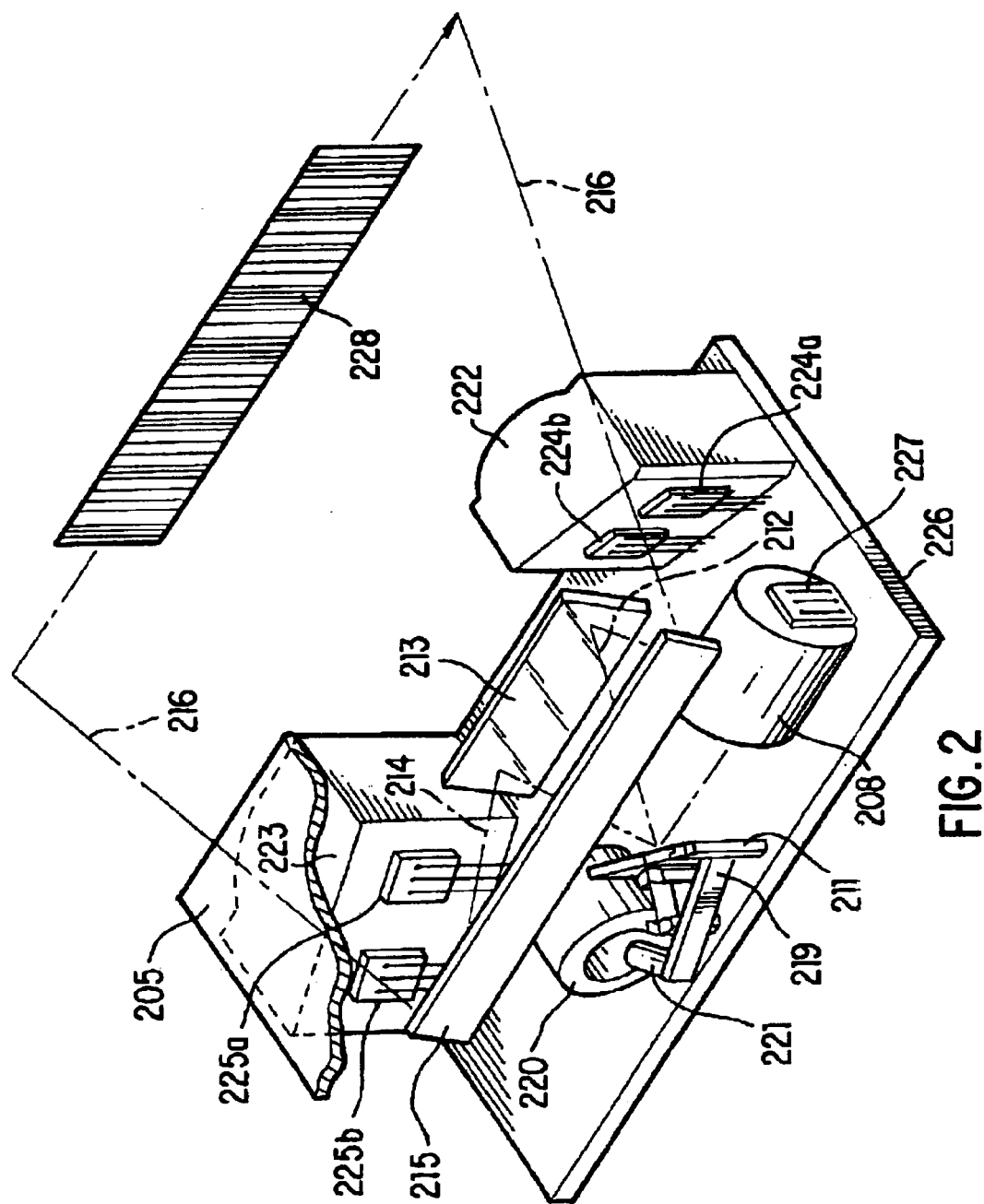
FIG. 2 is a particularly sectioned perspective view of an optical assembly according to a second preferred embodiment of the invention.

Turning next to another embodiment, shown in FIG. 2 from a different perspective, the laser beam is directed to an optical element 211, such as a planar mirror, which is moved so as to cause the beam to be deflected exteriorly of the module 200 towards a target plane. The beam is focused by the optical subassembly to form a spot on the target plane which moves along the scanning path 216 through the bars of the bar code symbol 228 on the target plane as the mirror 211 moves.

The optical element 211 is mounted on an assembly 219 which is caused to oscillate when alternating cm-rent is introduced in the coil 220. The oscillation results in a movement of the element 211 through an arc.

The scanning mirror 211 is mounted for oscillation about an axis, this being achieved by virtue of the interaction between a permanent magnet 221 and a driven electromagnetic coil 220. A suitable driving signal is applied to the coil, via the PCB 207 and coil electrical contacts.

The scanner motor drive 220 shown in FIG. 1 is exemplary, and may be replaced with any type of mechanism for effecting a scanning motion of the laser beam in one or two dimensions. For example, the scanner motor drive could comprise any of the configurations disclosed in U.S. Pat. Nos. 5,581,067 and 5,367,151, all of which are incorporated by reference. In this way, the static optics assembly may be used as a component in a variety of scanner designs.

The light reflected from the symbol is received by the photodetector 224a, 224b, 225a and 225b which are illustrated as discrete devices mounted behind the collection lenses 222.

The subassembly or device of FIGS. 1 and 2 may be implemented in any type of bar code reader, fixed or portable.

The photodetector output signal is then passed on to suitable electronics on the PCB 226.

Although a light masking aperture may be used in front of the photodetector for increasing the depth of focus of the photodetector, the same effect can be achieved without an aperture by appropriately specifying the area of the photodetector itself.

In another preferred embodiment, the type of motor drive used to oscillate the scan mirror can be a Mylar leaf spring supporting an unbalanced mirror assembly. The mirror assembly is mounted to a Mylar leaf spring which flexes as the permanent magnet is driven by the AC coil imparting an oscillating force.

Yet a further alternative is a "micro machined" mirror assembly as discussed in U.S. patent application Ser. Nos. 08/506,574 and 08/631,364 according to which the mirror is driven back and forth directly by a suitable drive motor, preferably of very small dimension. Yet a further alternative is to use a mirror of known rotating polygon type as discussed in the introduction in relation to U.S. Pat. No. 4,251,798 according to which the mirror comprises a solid body having a plurality of face angled to one another. As the body rotates the beam is scanned by successive rotating faces of the polygon body. In one embodiment the Mylar motor can be used in an arrangement for one dimensional scanning while a V-shaped taut band element (described above) can be used for two dimensional scanning also as discussed in more detail below.

The preferred laser 208 is a semiconductor laser is mounted by conventional through-hole techniques on the PCB. The photodiode is preferably an SMD ("surface mounted device") device as is the AC coil for the Mylar leaf spring motor. This eliminates the need for standoffs and hand-soldering or sockets, as are used on prior art scanners. Typically, the laser will be a standard packaged edge-emitting laser. For minimum cost, the laser focusing is not adjustable, and the laser is simply installed with its mounting flange in contact with a shoulder molded as part of the molded member.

As shown in FIG. 2 of the drawing, the laser 208 has downwardly-extending electrical leads 227 which are simply installed directly into the PCB 226. This eliminates hand-soldering, but soldering could be used if desired.

The use of an unbalanced mirror, i.e. one in which no counterweights are provided in the mirror assembly, is particularly suitable in implementation in which the mirror is driven at a speed of greater than 100 scans per second. With an unbalanced mirror, since the attachment points of the mirror to the flexible springs is not the center of mass of the mirror assembly, while the mirror is at rest, gravity will exert a relatively greater force on the side of the mirror assembly having the greater mass, causing the mirror to "droop" on its heavier side and pull on the flexible springs. Of course, the effect of such force depends on the orientation of the scanner with respect to the force vector of gravity. The same "drooping" effect is present when the mirror is scanning at relatively low speeds, so in such applications the use of a balanced mirror would be preferred. A balanced mirror, however, requires additional mass be added to the mirror, or mirror assembly, which is a drawback in terms of operating design weight and consequentially the power requirements.

In the embodiment of high speed operation (i.e. at more than 100 scans per second), the material composition, size, shape and thickness of the spring may be appropriately selected to achieve the desired resonant frequency. For example, for operation at approximately 200 scans/second, the selection of a Mylar spring with a thickness of 4 mil is appropriate. For operation at 400 scans/second, a stainless steel spring with a thickness of about 3 mil is preferred.

Typically, the intensity of the collected reflected light signal from the middle portion of the scan line is much higher than the one collected from the of the scan line when using a conventional single lens design. One embodiment of the present invention is to use a lens array(s). The lens array may have more than two lenses. Each individual lens of the array collects signal from a particular portion of the scan line. The field of view (FOV) of each lens may overlap. The size of each lens and orientation may be optimized in such a way to provide desired signal uniformity along the scan line.

Figure 3:
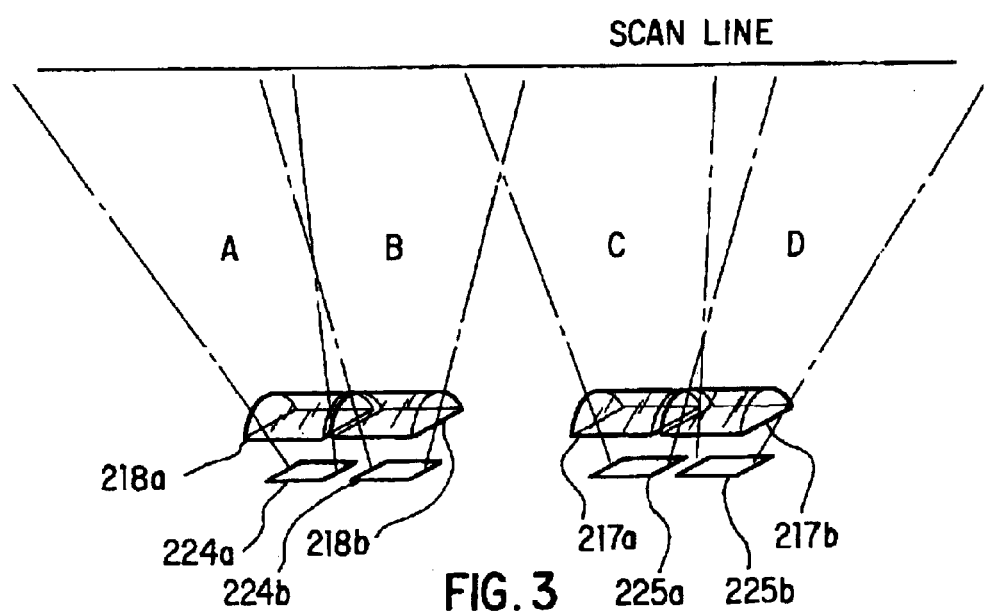
FIG. 3 shows a schematic of the use of four discrete photodetectors in the optical assembly according to another embodiment of the invention.

As illustrated in FIG. 3, each lens of the array may have an individual detector which is in turn connected to an amplifier. The gain of each amplifier may be adjusted to optimize signal uniformity along the scan line.

If the FOV of individual lenses are not overlapping, then the signals from those lenses may be combined together in such a way to subtract the ambient light and improve ambient light immunity of the entire system. For example, if the FOV A does not overlap with FOV C. Assuming that the ambient light is roughly uniform across each FOV then if the signals are subtracted, the ambient light is reduced but the useful signal of the laser beam is not since the laser spot does not present simultaneously in both FOVs. Subtracting the photodiode signal can be done in real time by reversing the signal with an appropriate electronic circuitry. For example, the use of the combination defined by SIGNAL=|A−C|+|B−D| may reduce the ambient light contribution.

Signal uniformity as a function of the scan angle is very important for reliable bar code reader performance. The amount of signal collected by the collection optics may vary substantially with the scan angle. Typically, the signal varies as the fourth power of the cosine of the incident beam angle. Such signal variations limit the scanner performance, or may require complex electronics to compensate for the effect.

Typically the intensity of the signal from the middle portion of the scan line is much higher than the intensity of the signal from light collected from the edge. One embodiment of collector optics design can improve the signal uniformity by equalizing the strong signal from the middle of the scan line (on axis) to the level similar to the one from the edge of the scan line (off axis).

Figure 4:
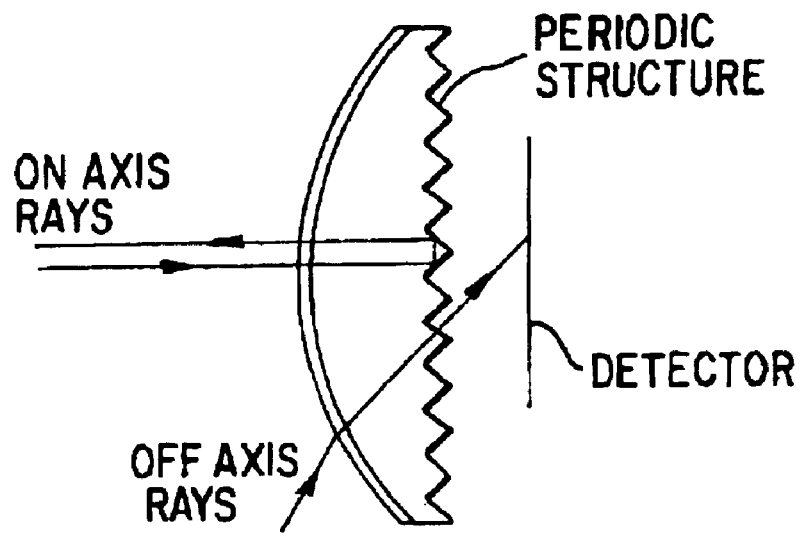
FIGS. 4, 5 6A and 6B are depictions of the operation of a collection lens in one embodiment of the present invention.
Figure 5:
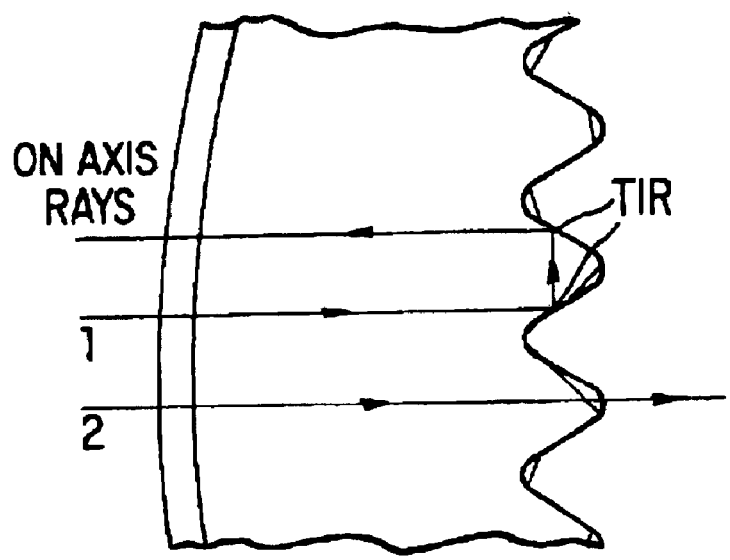

Referring to FIGS. 4 and 5, depicting a lens designs for use in a collection optics assembly, the rays from the middle of the scan line incidents with an angle on the second surface of the lens as shown by the "On Axis Rays". Due to total internal reflection (TIR) the rays reflects from this surface and incident again on another portion of the second surface, then undergo the second TIR and reflected away from the second surface. Some of the rays may not undergo TIR and may pass through the surface to the detector, as shown as the "Off Axis Rays". However, the net effect is that the number of rays which can reach the detector is reduced and the signal is smaller. If the rays are incident on the surface with an angle less than the critical angle (see the Figure depicting "Off Axis Rays" from the edge of the scan line), the rays may pass through the surface with no TIR and reach the detector.

In another embodiment, the present invention provides a sensor for detecting the reflected light and for generating an electrical signal corresponding to the symbol, the sensor including selectively activatable discrete first and second portions for receiving reflected light from respective first and second portions of the target corresponding to the position of the spot beam on the target.

In one embodiment, the sensor is vertically arranged such that the return light from an upper portion of the target is directed to the first portion, and the return light from a lower portion of the target is directed to the second portion. This embodiment is particularly suit to scanning a two-dimensional target, e.g. by a raster scanning beam.

In another embodiment, the sensor is horizontally arranged such that the return light from a right side of the target is directed to the first portion, and the return light from a left side portion of the target is directed to the second portion.

As a result, the strength of the collected light signal from the signal received from the edge of the scan line is increased, while the signal received from the middle is reduced.

A similar approach is to provide collection optics so that the lens collects less light from one particular direction (e.g., the middle of the scan line) and more form the other (e.g., the edge of the scan line).

Figure 6A:
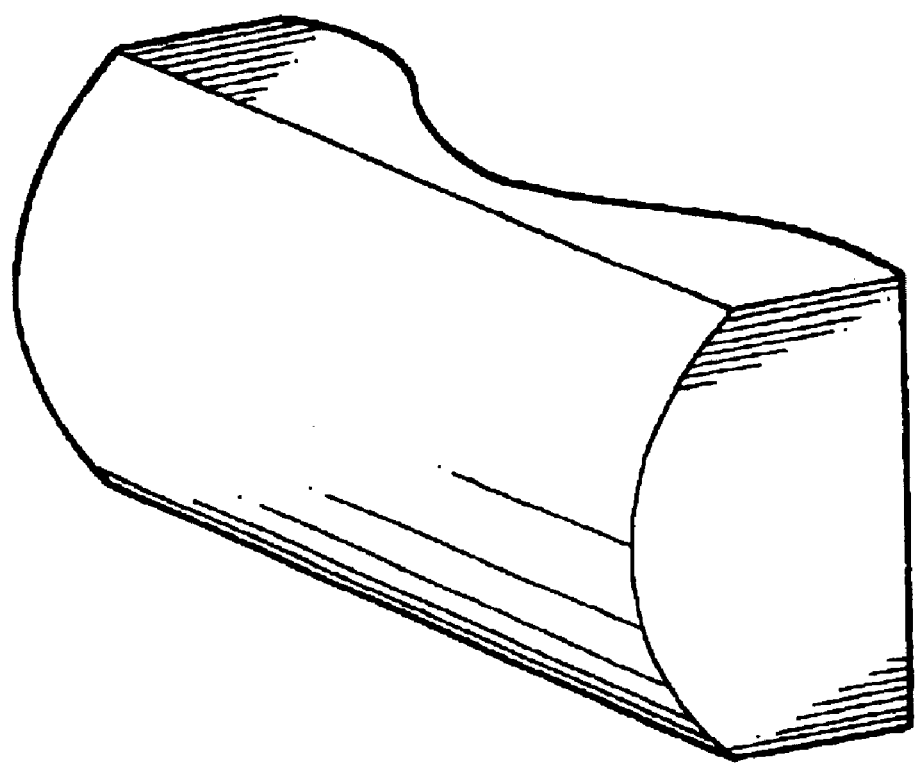
Figure 6B:
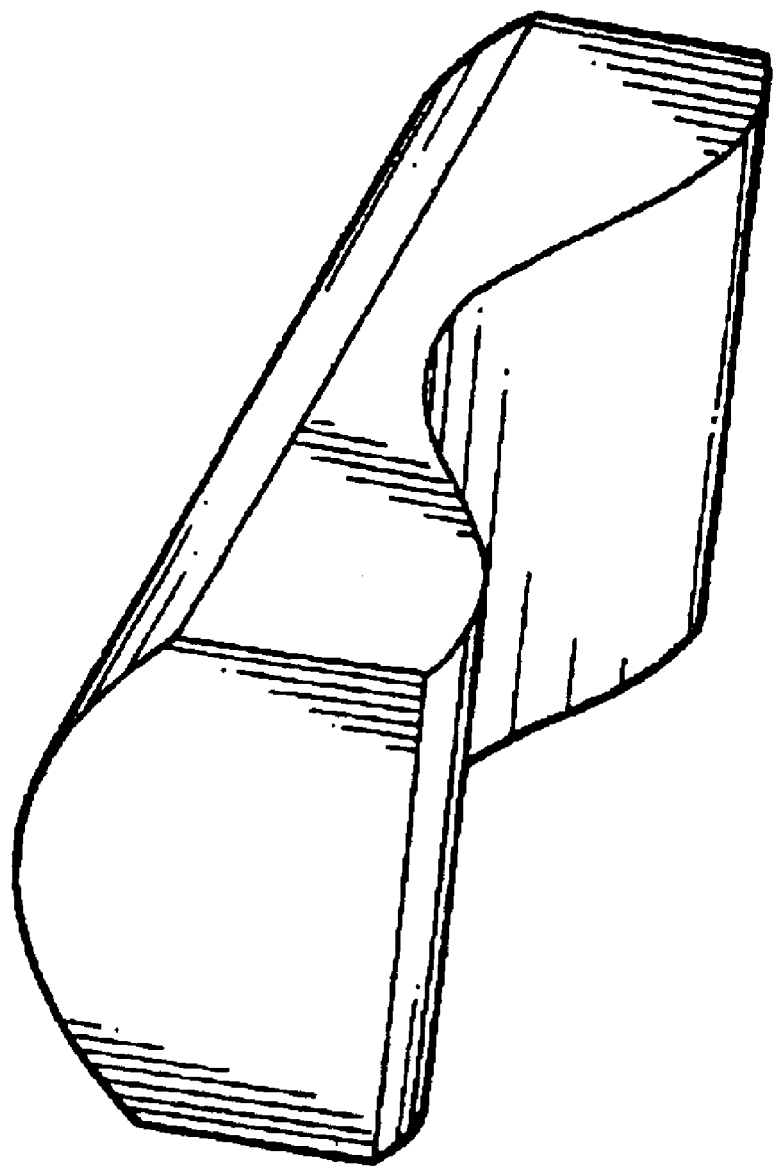

Turning to the second lens design, shown in FIGS. 6A and 6B, the second surface of the lens has a free form surface, which in a preferred embodiment may be sinusoidal as shown in the drawings.

For the rays which are in the middle of the scan line, and along the optical axis of the collection liens, the lens has negative power and therefore, disperses the rays and reduces the light intensity on the detector. For the rays which are from the ends of the scan line, and are incident on the lens with an angle, the lens has a positive power and collects more rays and increases the light intensity on the detector.

It will be understood that each of the features described above, or two or more together, may find a useful application in other types of scanners and bar code readers differing from the types described above.

While the invention has been illustrated and described as embodied in a scan module for an electro-optical scanner, it is not intended to be limited to the details shown, since various modifications and structural changes may be made without departing in any way from the spirit and scope of the present invention. In particular it will be recognized that features described in relation to one embodiment can be incorporated into other embodiments as appropriate in a manner that will be apparent to the skilled reader.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims. What is claimed as new and desired to be protected by Letters Patent is set forth in the appended claims.

We claim:

1. A scan module for a system for electro-optically reading indicia, comprising:
   a) a support including a base lying in a first plane, a frame wall having an opening and lying in a second plane elevated and parallel to the first plane, and a raised support wall elevated above the frame wall at a rear side of the support;
   b) a light source mounted on the support for emitting a light beam;
   c) a scan mirror mounted on the support for reciprocal oscillating movement to reflect the light beam incident on the scan mirror;
   d) a drive mounted on the support for reciprocally oscillating the scan mirror to sweep the incident light beam reflected therefrom; and
   e) a pair of beam-folding reflectors, one of the reflectors being mounted on the raised support wall, and the other of the reflectors being mounted at a front side of the support spaced away from the rear side, the other reflector being operative for reflecting the light beam reflected from the scan mirror through the opening in the frame wall to the one reflector, the one reflector being operative for reflecting the light beam reflected from the other reflector above the frame wall and exteriorly of the support between the rear and front sides thereof toward the indicia to be read.

2. The module of claim 1, wherein the light source is a semiconductor laser mounted at the rear side of the support between the frame wall and the base.

3. The module of claim 1, wherein the scan mirror is a planar mirror mounted at the rear side of the support between the frame wall and the base.

4. The module of claim 1, wherein the drive includes an electromagnetic coil mounted at the rear side of the support between the frame wall and the base.

5. The module of claim 1, wherein each reflector is a planar mirror.

6. The module of claim 1, and a pair of sensors for detecting light reflected from the indicia, the sensors being mounted at the front side of the support between the frame wall and the base.

7. The module of claim 6, wherein the other reflector is mounted between the pair of sensors.

8. The module of claim 1, wherein the base is a printed circuit board.

9. The module of claim 6, wherein each sensor includes a pair of photodiodes and a pair of collection lenses, one lens for each photodiode.

10. The module of claim 1, wherein the support has a generally parallelepiped shape.

* * * * *